(12) United States Patent
Butler et al.

(10) Patent No.: US 8,127,417 B1
(45) Date of Patent: Mar. 6, 2012

(54) BEARING ASSEMBLY REMOVAL SYSTEM AND METHOD

(75) Inventors: Scott Butler, Fort Worth, TX (US);
Michael P. Alvey, Arlington, TX (US);
Bryan Alan Brown, Godley, TX (US)

(73) Assignee: American Airlines, Inc., Fort Worth, TX (US)

( * ) Notice: Subject to any disclaimer, the term of this patent is extended or adjusted under 35 U.S.C. 154(b) by 1409 days.

(21) Appl. No.: 11/678,966

(22) Filed: Feb. 26, 2007

(51) Int. Cl.
*B23P 19/04* (2006.01)

(52) U.S. Cl. .................. 29/255; 29/281.1; 29/281.5

(58) Field of Classification Search .......... 29/281.1, 29/255, 281.3, 281.5; 269/17; 254/133 R, 254/134

See application file for complete search history.

(56) References Cited

U.S. PATENT DOCUMENTS

| | | | | |
|---|---|---|---|---|
| 4,180,252 A * | 12/1979 | Cushenbery | ............... | 269/17 |
| 5,181,821 A * | 1/1993 | King, Sr. | ............... | 414/427 |
| 6,877,199 B2 * | 4/2005 | Cassese et al. | ............... | 29/283.5 |
| 7,114,233 B1 * | 10/2006 | Wyrick et al. | ............... | 29/426.5 |
| 7,334,306 B2 * | 2/2008 | Beverley et al. | ............... | 29/281.1 |
| 7,766,306 B2 * | 8/2010 | Morey | ............... | 254/28 |

* cited by examiner

*Primary Examiner* — Lee D Wilson

(74) *Attorney, Agent, or Firm* — Haynes and Boone, LLP

(57) ABSTRACT

A system and method according to which a bearing assembly is removed from a casing. In several exemplary embodiments, the bearing assembly is removed from a turbine casing such as, for example, a gas-turbine casing in a jet engine.

20 Claims, 10 Drawing Sheets

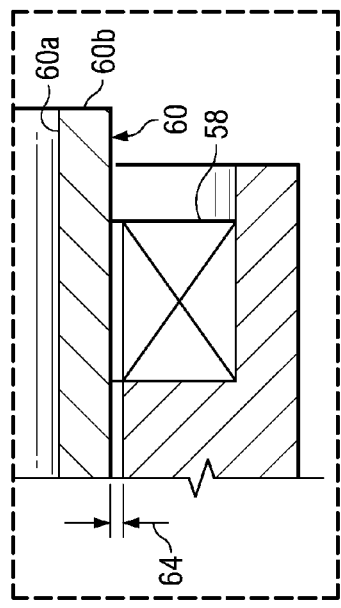
*Fig. 6B*
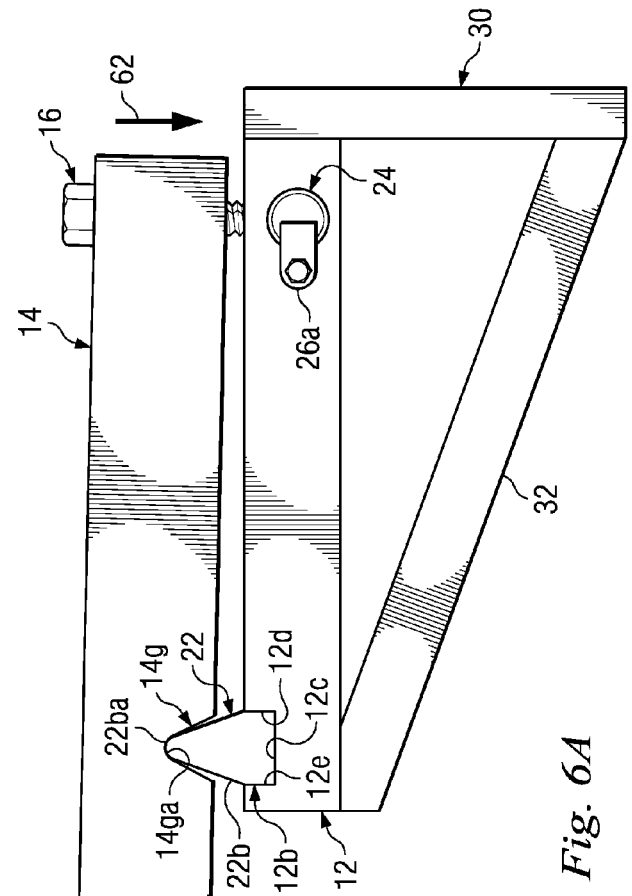
*Fig. 6A*
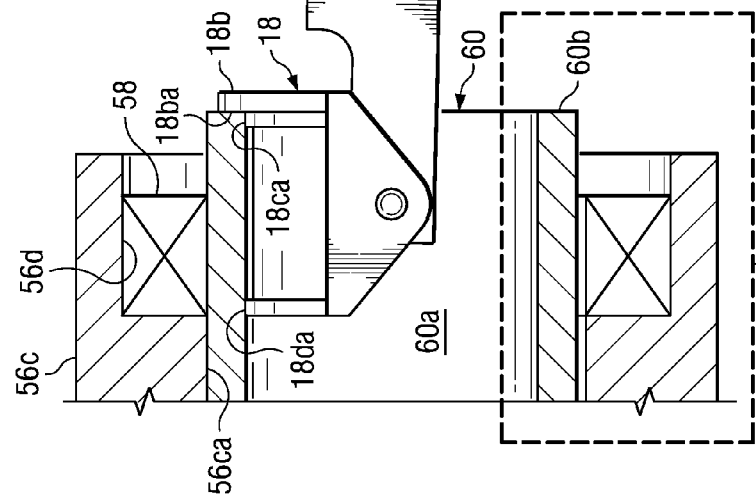

BEARING ASSEMBLY REMOVAL SYSTEM AND METHOD

BACKGROUND

The present disclosure relates in general to bearing assemblies, and in particular to the removal of bearing assemblies from casings such as, for example, gas-turbine casings in jet engines.

BRIEF DESCRIPTION OF THE DRAWINGS

FIG. 6A is a view similar to that of FIG. 5B, but depicting the system is another operational mode.

FIG. 6B is an enlarged view, not necessarily to scale, of a portion of the view depicted in FIG. 6A.

DETAILED DESCRIPTION

Figure 1:
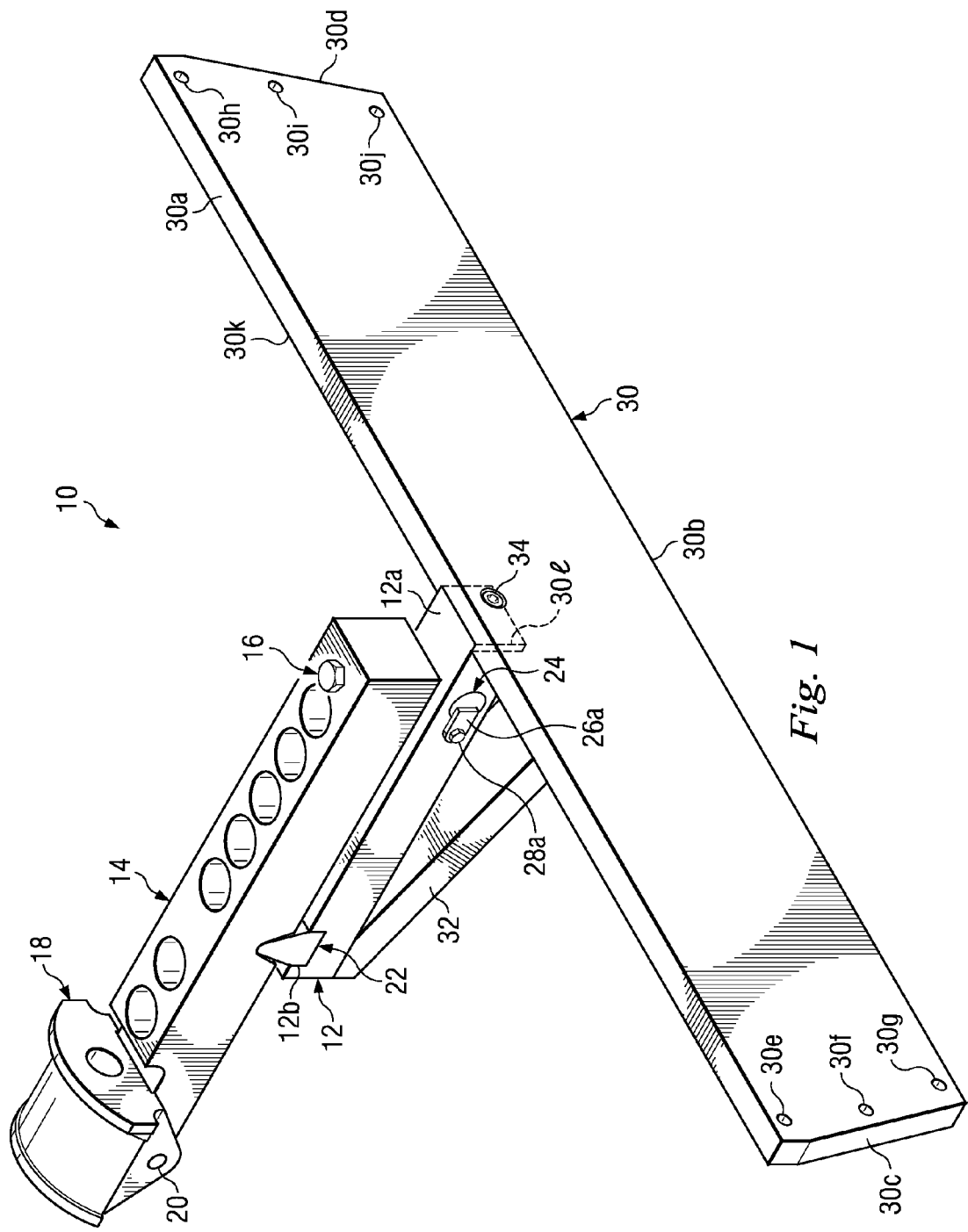
FIG. 1 is a perspective view, not necessarily to scale, of a lever device according to an exemplary embodiment, the lever device including a lift saddle.
Figure 2:
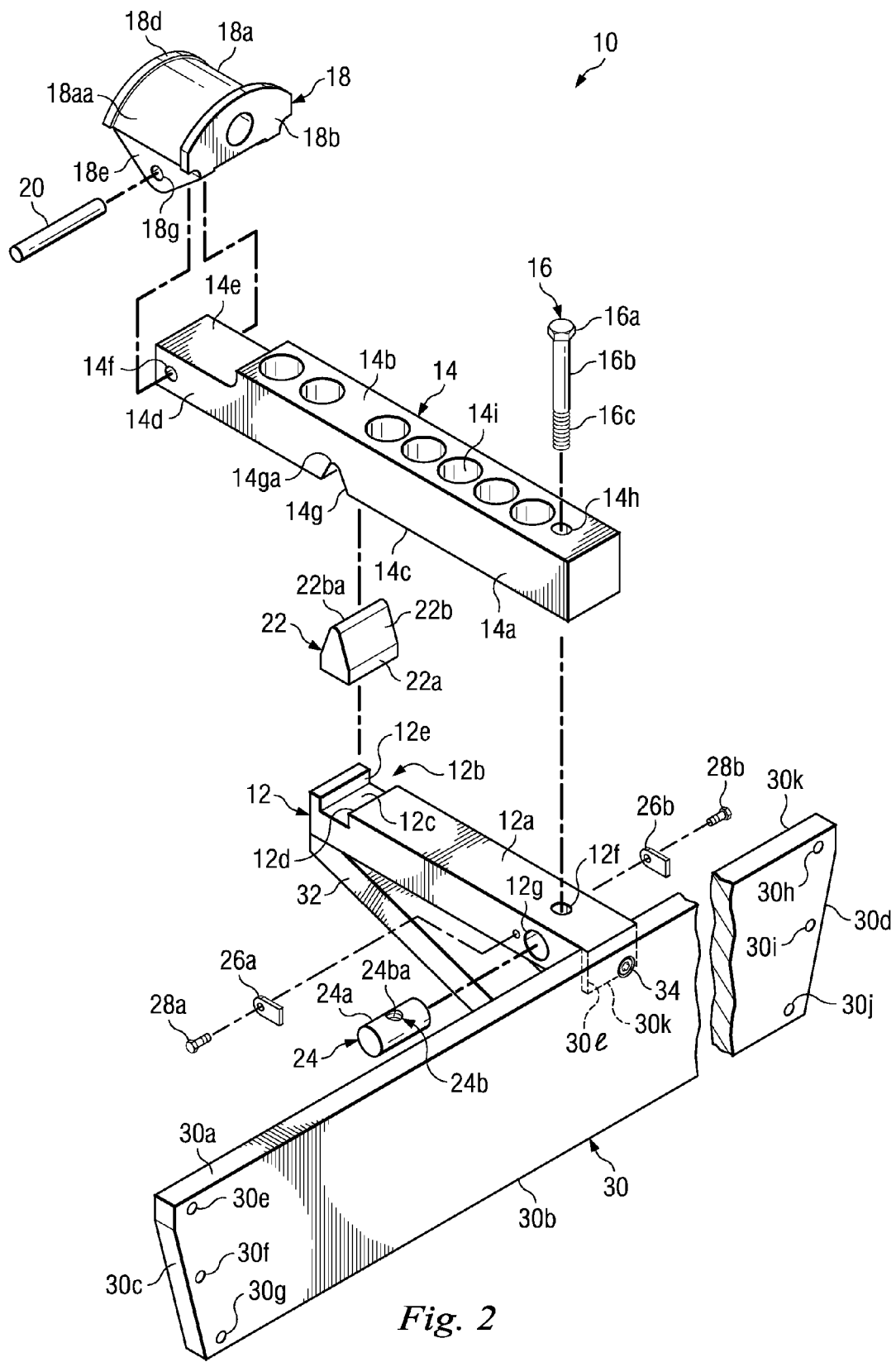
FIG. 2 is an exploded perspective view of the lever device of FIG. 1.
Figure 3:
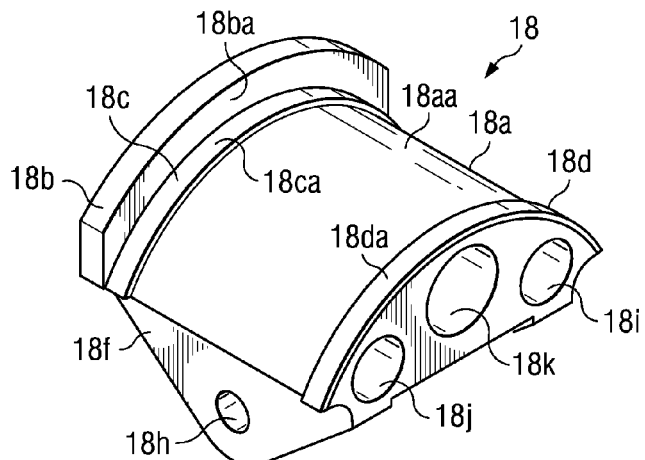
FIG. 3 is a perspective view of the lift saddle of the lever device of FIGS. 1 and 2.

In an exemplary embodiment, as illustrated in FIGS. 1, 2 and 3, a lever device is generally referred to by the reference numeral 10 and includes a base member 12, a generally horizontally-extending arm 14 and a fastener 16 coupling the arm 14 to the base member 12. A lift block, or lift saddle 18, is pivotally coupled to the arm 14 via a dowel 20, and a fulcrum block 22 is disposed between the base member 12 and the arm 14. A cage nut 24 is engaged with the base member 12, and traps 26a and 26b are coupled to the base member 12 via fasteners 28a and 28b, respectively. The traps 26a and 26b engage the cage nut 24. A mounting plate 30 is coupled to the base member 12, and an angularly-extending brace 32 is coupled to the plate 30 and the arm 14.

In an exemplary embodiment, the base member 12 includes a horizontally-extending bar 12a and a transversely-extending channel 12b formed in the bar 12a and defining surfaces 12c, 12d and 12e. A slot 12f extends vertically through the bar 12a, and a bore 12g extends horizontally through the bar 12a. The bore 12g is transverse to and intersects the slot 12f.

In an exemplary embodiment, the arm 14 includes a horizontally-extending protrusion 14a defining a top surface 14b and a bottom surface 14c, and a horizontally-extending protrusion 14d extending from an end of the protrusion 14a and defining a surface 14e that is vertically offset from the top surface 14b. A transverse bore 14f extends horizontally through the protrusion 14d. A generally V-shaped channel 14g including a fillet 14ga is formed in the bottom surface 14c of the protrusion 14a, and extends in a direction transverse to the general direction of extension of the arm 14. A slot 14h extends vertically through the protrusion 14a. A plurality of parallel-spaced bores 14i having substantially identical diameters extend through the protrusion 14a, and are positioned along the protrusion 14a both between the slot 14h and the generally V-shaped channel 14g, and between the generally V-shaped channel 14g and the protrusion 14d.

In an exemplary embodiment, the fastener 16 includes a head 16a, a non-threaded portion 16b and an external threaded connection 16c. In an exemplary embodiment, the fastener 16 is a 0.500–20×3.5" long machine screw, grade B.

In an exemplary embodiment, the lift saddle 18 includes an arcuate block 18a and an arcuate flange 18b extending upwardly from an end of the arcuate block 18a and defining a vertical surface 18ba, which is shown in FIG. 3. An arcuate rib 18c defining an arcuate surface 18ca extends upwardly from the arcuate block 18a and is adjacent the flange 18b. An arcuate rib 18d defining an arcuate surface 18da extends upwardly from the end of the arcuate block 18a opposing the flange 18b. The arcuate surfaces 18ca and 18da are both axially and radially aligned. Parallel-spaced brackets 18e and 18f extend downwardly from the arcuate block 18a, and axially-aligned bores 18g and 18h extend through the brackets 18e and 18f, respectively. The arcuate block 18a defines an arcuate surface 18aa between the ribs 18c and 18d. Horizontally-extending blind bores 18i and 18j are formed in the arcuate block 18a, extending towards the flange 18b, and a bore 18k is formed through the arcuate block 18a.

In an exemplary embodiment, and as noted above, the dowel 20 pivotally couples the lift saddle 18 to the arm 14. More particularly, the lift saddle 18 is positioned so that the protrusion 14d of the arm 14 extends between the brackets 18e and 18f of the lift saddle 18, so that the vertically-extending surface 18ba faces away from the protrusion 14a of the arm, and so that the bore 18g of the lift saddle 18, the bore 14f of the arm 14, and the bore 18h of the lift saddle 18 are axially aligned with each other. The dowel 20 extends through the axially-aligned bores 18g, 14f and 18h, thereby pivotally coupling the lift saddle 18 to the arm 14.

In an exemplary embodiment, the fulcrum block 22 includes a rectangular block portion 22a and a generally V-shaped wedge portion 22b extending upwardly therefrom and including a round 22ba at its distal end.

In an exemplary embodiment, the cage nut 24 includes a cylindrical body 24a and a transverse bore 24b extending therethrough and including an internal threaded connection 24ba.

In an exemplary embodiment, and as noted above, the cage nut 24 is engaged with the base member 12. More particularly, the cylindrical body 24a extends within the bore 12g of the base member 12 so that the cage nut 24 is supported by the base member 12 and is free to rotate in place about its longitudinal axis.

In an exemplary embodiment, and as noted above, the traps 26a and 26b engage the cage nut 24. More particularly, the traps 26a and 26b engage respective opposing ends of the cylindrical body 24a of the cage nut 24, thereby generally preventing the cage nut 24 from sliding out of the bore 12g of the base member 12, thereby generally capturing the cage nut 24 within the base member 12.

In an exemplary embodiment, the plate 30 defines a top surface 30a and a bottom surface 30b spaced in a parallel relation therewith, and includes opposing sides 30c and 30d, circumferentially-spaced bores 30e, 30f and 30g positioned proximate the side 30c, and circumferentially-spaced bores 30h, 30i and 30j positioned proximate the side 30d. The bores 30e, 30f, 30g, 30h, 30i and 30j are circumferentially aligned. A vertically-extending surface 30k extends between the top surface 30a and the bottom surface 30b, and a recess 30l is formed in both the top surface 30a and the vertically-extending surface 30k.

In an exemplary embodiment, and as noted above, the plate 30 is coupled to the base member 12. More particularly, one end portion of the base member 12 is positioned in the recess 30l, and a fastener 34 extends through the plate 30 and into the end portion of the base member 12 positioned in the recess 30l. Moreover, as noted above, the angularly-extending brace 32 is coupled to the plate 30 and the base member 12. More particularly, the brace 32 extends from the plate 30 to the base member 12, with one end of the brace 32 being proximate or adjacent the bottom surface 30b of the plate 30 and the brace 32 extending angularly upwardly therefrom to the other end portion of the base member 12 opposing the end portion of the base member 12 positioned in the recess 30l. In an exemplary embodiment, the brace 32 is welded to the plate 30 and the base member 12.

Figure 4:
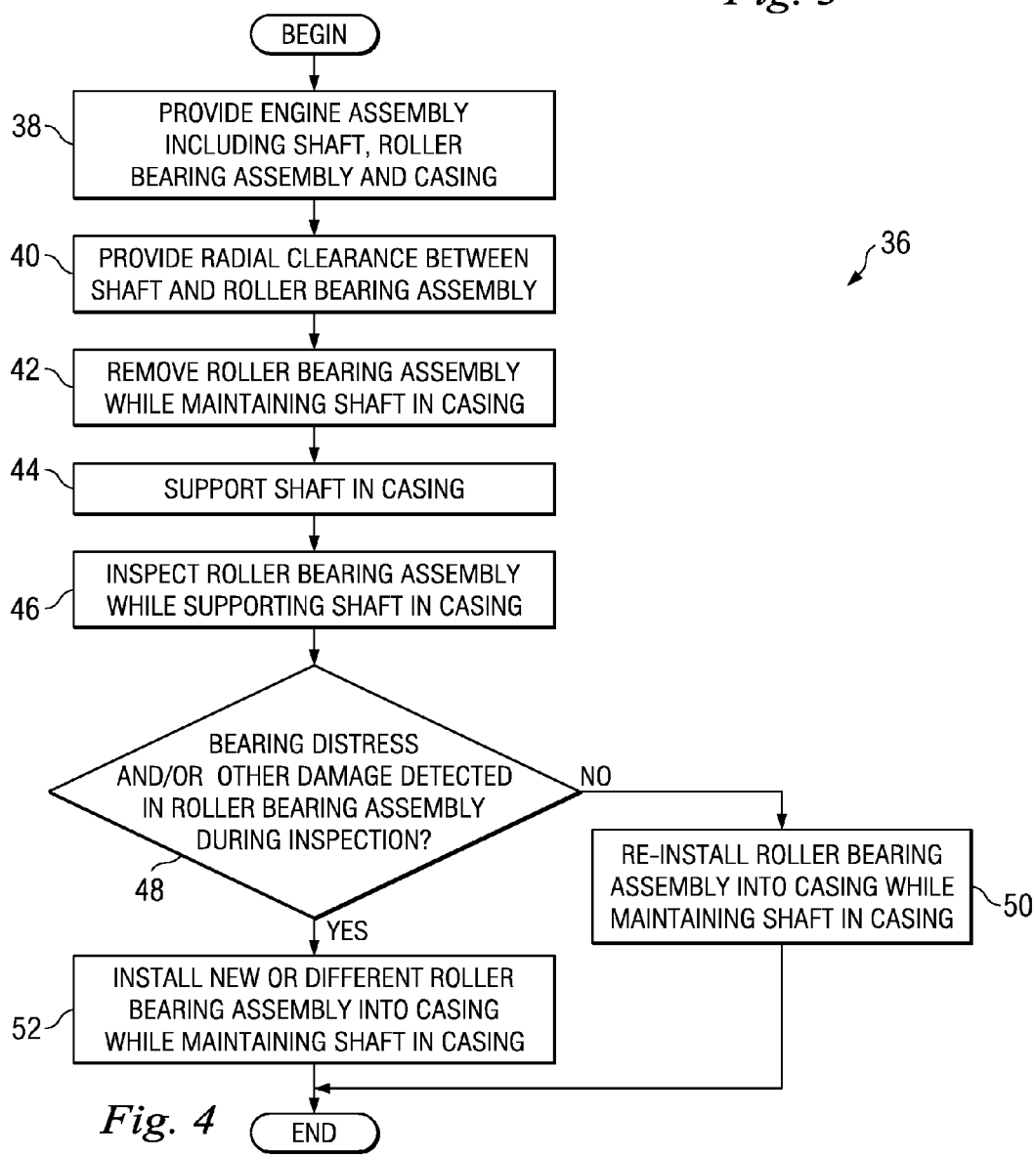
FIG. 4 is a flow chart illustration of a method of operating the lever device of FIGS. 1, 2 and 3 according to an exemplary embodiment.

In an exemplary embodiment, as illustrated in FIG. 4 with continuing reference to FIGS. 1, 2 and 3, a method 36 of operating the device 10 includes providing an engine assembly including a shaft, a roller bearing assembly and a casing in step 38, providing a radial clearance between the shaft and the roller bearing assembly of the engine assembly in step 40, removing the roller bearing assembly from the casing while substantially maintaining the position of the shaft in the casing in step 42, supporting the shaft in the casing in step 44, and inspecting the removed roller bearing assembly for damage while supporting the shaft in the casing in step 46. The method 36 further includes determining in step 48 whether damage such as bearing distress was detected in the removed roller bearing assembly during inspection, and either re-installing the removed roller bearing assembly into the casing while maintaining the shaft in the casing in step 50, or installing a new or different roller bearing assembly into the casing while maintaining the shaft in the casing in step 52. The steps 38, 40, 42, 44, 46, 48, 50 and 52 of the method 36 are described in further detail below.

Figure 5A:
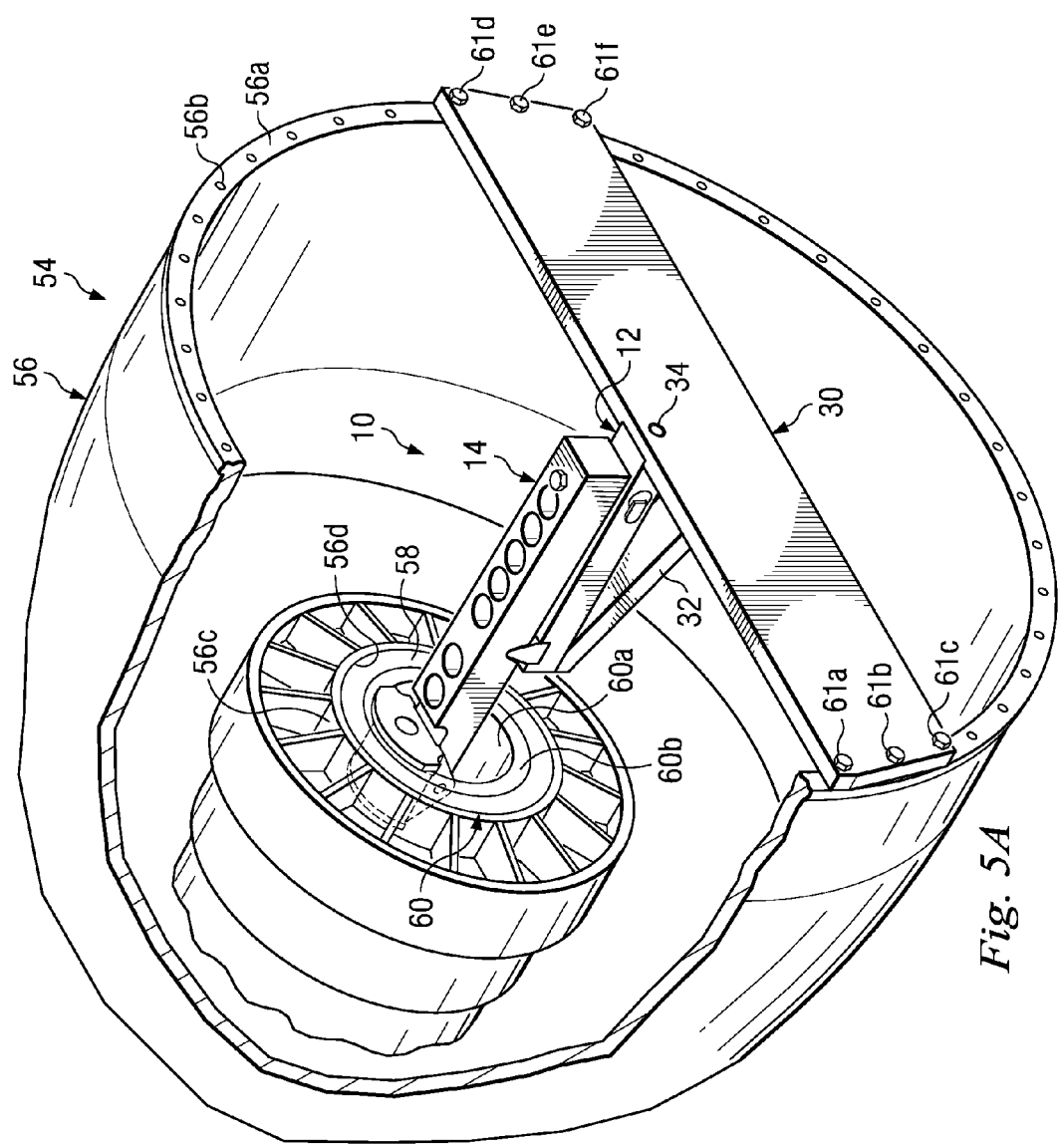
FIG. 5A is a perspective view, not necessarily to scale, of an exemplary embodiment of a system including an engine assembly and the lever device of FIGS. 1, 2 and 3, the engine assembly including a casing, a roller bearing assembly positioned in the casing and a shaft extending through the roller bearing assembly, the casing including a flange to which the lever device is coupled.
Figure 5B:
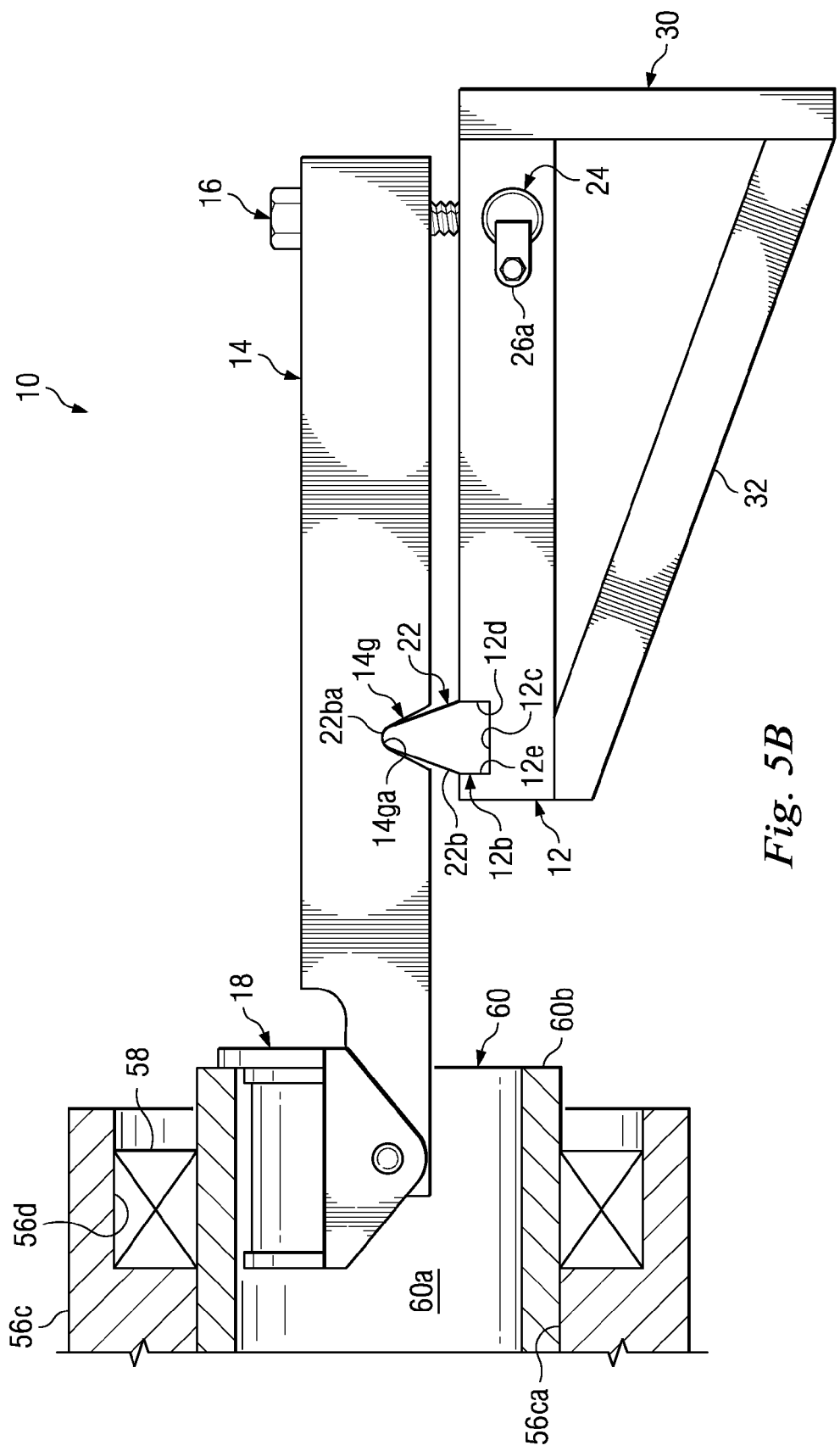
FIG. 5B is a partial sectional/partial elevational view, not necessarily to scale, of the system of FIG. 5A, with portions of the casing, including the flange, removed for the purpose of clarity.

In an exemplary embodiment, as illustrated in FIGS. 5A and 5B with continuing reference to FIGS. 1, 2, 3 and 4, the step 38 of the method 36 includes providing an engine assembly 54 including a casing 56 including an end flange 56a, a plurality of circumferentially-spaced bores 56b formed in the flange 56a, a support 56c defining an axially-extending passage 56ca, and an internal annular recess 56d formed in the support 56c. A roller bearing assembly 58 is positioned in the casing 56, extending in the recess 56d. A shaft 60 defining an axially-extending passage 60a and including an end 60b extends within the passage 56ca and through the roller bearing assembly 58, and is at least partially supported by the roller bearing assembly 58. The shaft 60 and the casing 56 are generally horizontally oriented.

In an exemplary embodiment, as illustrated in FIGS. 5A and 5B with continuing reference to FIGS. 1, 2, 3 and 4, the step 40 of the method 36 includes coupling the plate 30 to the base member 12, and coupling the brace 32 to the plate 30 and the base member 12, in accordance with the foregoing. The plate 30 is positioned against the flange 56a of the casing 56 so that the plate 30 extends generally horizontally across the casing 56. Fasteners 61a, 61b, 61c, 61d, 61e and 61f extend through the bores 30e, 30f, 30g, 30h, 30i and 30j, respectively, of the plate 30 and into respective axially-aligned bores in the plurality of bores 56b of the casing 56. As a result, the base member 12 extends into the casing 56 and towards the shaft 60.

In an exemplary embodiment, as illustrated in FIGS. 5A and 5B with continuing reference to FIGS. 1, 2, 3 and 4, the fulcrum block 22 is disposed in the channel 12b of the base member 12 so that the rectangular block 22a contacts the surface 12c and extends between the surfaces 12d and 12e of the base member 12. As a result, the fulcrum block 22 is supported by the base member 12 and is positioned in the casing 56. The arm 14 and the lift saddle 18 pivotally coupled thereto are positioned so that the generally V-shaped wedge 22b of the fulcrum block 22 extends up into the generally V-shaped channel 14g of the arm 14, and the arm 14 is at least partially supported by the fulcrum block 22. Moreover, the slot 14h of the arm 14 is generally aligned with the slot 12f of the base member 12, which, in turn, is aligned with the bore 24b of the cage nut 24. The fastener 16 extends through the aligned slots 14h and 12f and into the bore 24b so that the external threaded connection 16c of the fastener 16 initially engages the internal threaded connection 24ba of the cage nut 24, thereby coupling the arm 14 to the base member 12. As a result of the positioning of the arm 14 within the casing 56 and the coupling of the arm 14 to the base member 12, the lift saddle 18 is at least partially disposed within the passage 60a of the shaft 60, with the vertically-extending surface 18ba of the flange 18b of the lift saddle 18 proximate or contacting the end 60b of the shaft 60. As shown in FIG. 5B, both the lift saddle 18 and the arm 14 are generally horizontally oriented when the external threaded connection 16c of the fastener 16 is initially engaged with the internal threaded connection 24ba of the cage nut 24.

In an exemplary embodiment, the plurality of bores 14i in the arm 14 reduces the overall weight of the arm 14, thereby facilitating the positioning of the arm 14 and the lift saddle 18 within the casing 56 and the coupling of the arm 14 to the base member 12. In an exemplary embodiment, the bores 18i, 18j and 18k reduce the overall weight of the lift saddle 18, thereby facilitating the positioning of the arm 14 and the lift saddle 18 within the casing 56 and the coupling of the arm 14 to the base member 12.

In an exemplary embodiment, as illustrated in FIGS. 6A and 6B with continuing reference to FIGS. 1, 2, 3, 4, 5A and 5B, the fastener 16 is driven downward, as viewed in FIG. 6A and indicated by an arrow 62, so that the external threaded connection 16c of the fastener 16 further engages the internal threaded connection 24ba of the cage nut 24. In response to this downward movement of the fastener 16, the arm 14 pivots about the fulcrum block 22 in a clockwise direction, as viewed in FIG. 6A. In an exemplary embodiment, the fillet 14ga of the arm 14 and the round 22ba of the fulcrum block 22 provides a generally smooth engagement interface between the arm 14 and the fulcrum block 22, thereby facilitating the pivoting of the arm 14 about the fulcrum block 22.

In an exemplary embodiment, during the pivoting of the arm 14 about the fulcrum block 22, the slot 14h of the arm 14 may permit some relative movement between the fastener 16 and the arm 14, and the slot 12f of the base member 12 may permit some relative movement between the fastener 16 and the base member 12. Moreover, during the pivoting of the arm 14 about the fulcrum block 22, the fastener 16 pivots along with the arm 14 and the cage nut 24 rotates in place in a clockwise direction, as viewed in FIG. 6A, in order to accommodate the pivoting of the fastener 16, thereby permitting further engagement between the external threaded connection 16c of the fastener 16 and the internal threaded connection 24ba of the cage nut 24.

In an exemplary embodiment, in response to the pivoting of the arm 14 about the fulcrum block 22, the lift saddle 18 moves upward in the passage 60a, towards the inside surface of the shaft 60 defined by the passage 60a. As a result of the pivoting of the arm 14 about the fulcrum block 22 and the resulting upward movement of the lift saddle 18, the arcuate surfaces 18ca and 18da contact the inside surface of the shaft 60 and the vertically-extending surface 18ba contacts the end 60b of the shaft 60, as shown in FIG. 7.

In an exemplary embodiment, the continued downward movement of the fastener 16, and the resulting continued pivoting of the arm 14 about the fulcrum block 22, causes the lift saddle 18 to apply a force in a direction transverse to the axial extension of the shaft 60, pushing up against the inside surface of the shaft 60 defined by the passage 60a. The pivotal coupling between the lift saddle 18 and the arm 14 permits the lift saddle 18 to move upwards while the arm 14 continues to pivot. The contact between the vertically-extending surface 18ba of the lift saddle 18 and the end 60b of the shaft 60 generally resists relative movement between the lift saddle 18 and the shaft 60. The continued application of the force against the inside surface of the shaft 60 defined by the passage 60a, via the arcuate surfaces 18ca and 18da of the lift saddle 18, eventually causes the shaft 60, or at least a portion of the shaft 60 in the vicinity of the lift saddle 18, to move upwards. As a result, in an exemplary embodiment, a radial clearance 64 is provided between the outside surface of the shaft 60 and the bearing assembly 58, as shown in FIG. 6B. As a result, the force exerted on the bearing assembly 58 by the shaft 60 is reduced. In an exemplary embodiment, the mechanical advantage provided by the pivoting of the arm 14 about the fulcrum block 22 is about 1.23.

Figure 7:
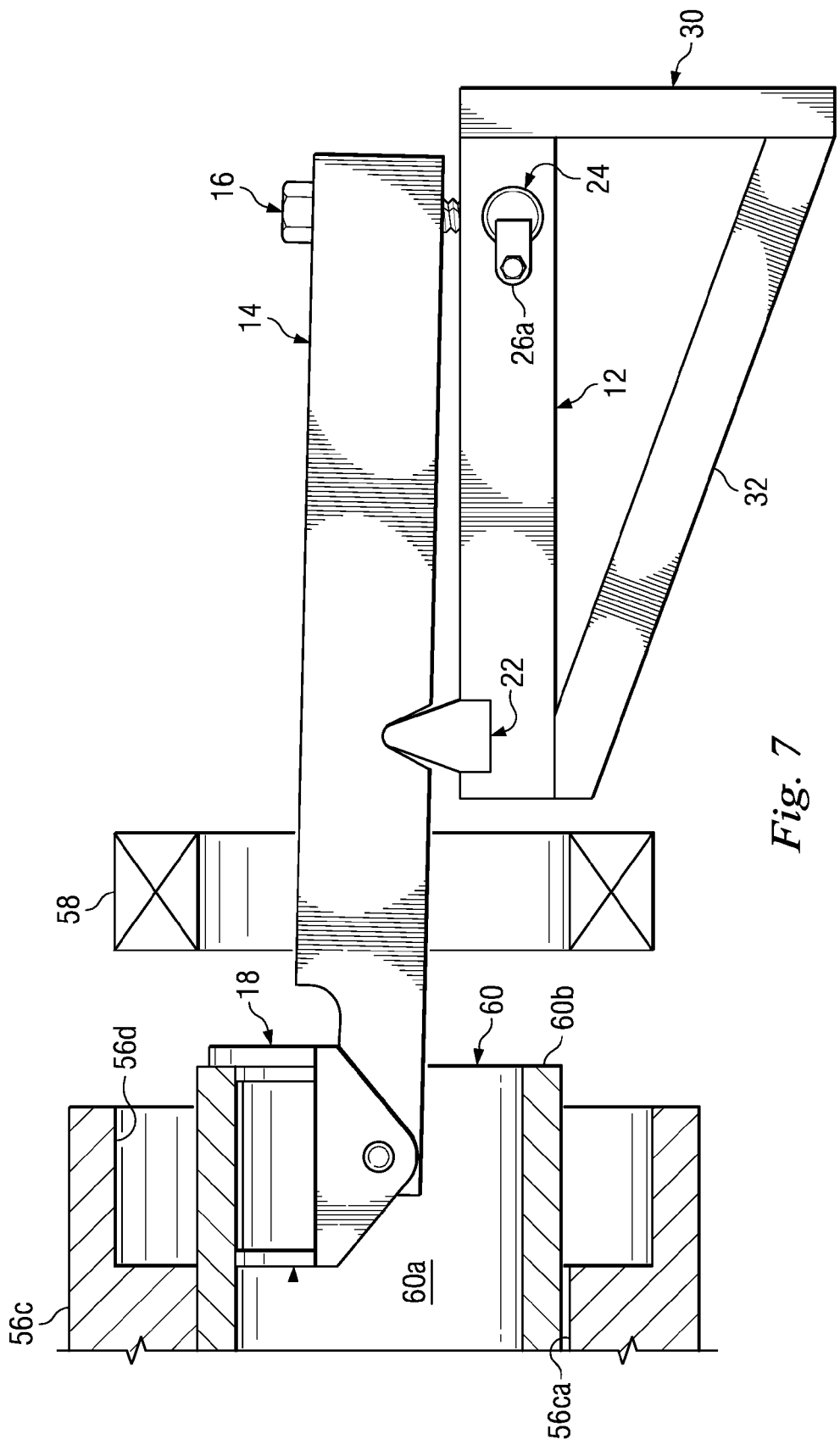
FIG. 7 is a view similar to that of FIG. 6A, but depicting the system in yet another operational mode.

In an exemplary embodiment, as illustrated in FIG. 7 with continuing reference to FIGS. 1, 2, 3, 4, 5A, 5B, 6A and 6B, the step 42 of the method 36 includes forcing and/or pulling the bearing assembly 58 in a direction towards the plate 30 of the device 10 during the upward movement of the shaft 60. As the radial clearance 64 increases due to the continued upward movement of the shaft 60, the bearing assembly 58 begins to move, or at least shift, towards the plate 30 in response to the pulling of the bearing assembly 58 towards the plate 30. Eventually, the radial clearance 64 increases to a point, and the force exerted on the bearing assembly 58 by the shaft 60 correspondingly decreases to a point, where the bearing assembly 58 is permitted to move axially and thus slides off of the shaft 60 in response to the pulling of the bearing assembly 58. The bearing assembly 58 is slid over the arm 14 of the device 10. As a result, the roller bearing assembly 58 is removed from its position in the casing 56 while the position and the generally horizontal orientation of the shaft 60 are substantially maintained in the casing 56.

In an alternative exemplary embodiment, further engagement of the external threaded connection 16c of the fastener 16 with the internal threaded connection 24ba of the cage nut 24 is stopped and thus any additional lifting of the shaft 60 is stopped, but the engagement between the fastener 16 and the cage nut 24 maintains the position of the lift saddle 18, thereby maintaining the position of the shaft 60 in the casing 56. After stopping the lifting of the shaft 60, the bearing assembly 58 is pulled off of the shaft 60 and towards the plate 30. As a result, the roller bearing assembly 58 is removed from its position in the casing 56 while the position and the generally horizontal orientation of the shaft 60 are maintained in the casing 56.

In several exemplary embodiments, instead of, or in addition the radial clearance 64, one or more other radial clearances may be provided in response to the upward movement of the lift saddle 18 and the lifting of at least a portion of the shaft 60. In several exemplary embodiments, instead of, or in addition to the radial clearance 64, one or more radial clearances may be provided between the bearing assembly 58 and another portion of the casing 56, such as one or more surfaces of the casing 56 defined by the internal annular recess 56d, and/or between the bearing assembly 58 and one or more other components of the engine assembly 54. In several exemplary embodiments, instead of, or in addition to the radial clearance 64, one or more radial clearances may be provided at one or more positions along the vertical stack-up of the engine assembly 54, including the casing 56, the bearing assembly 58 and the shaft 60, in response to the above-described pivoting of the arm 14 and the force applied against the shaft 60 by the lift saddle 18.

Figure 8:
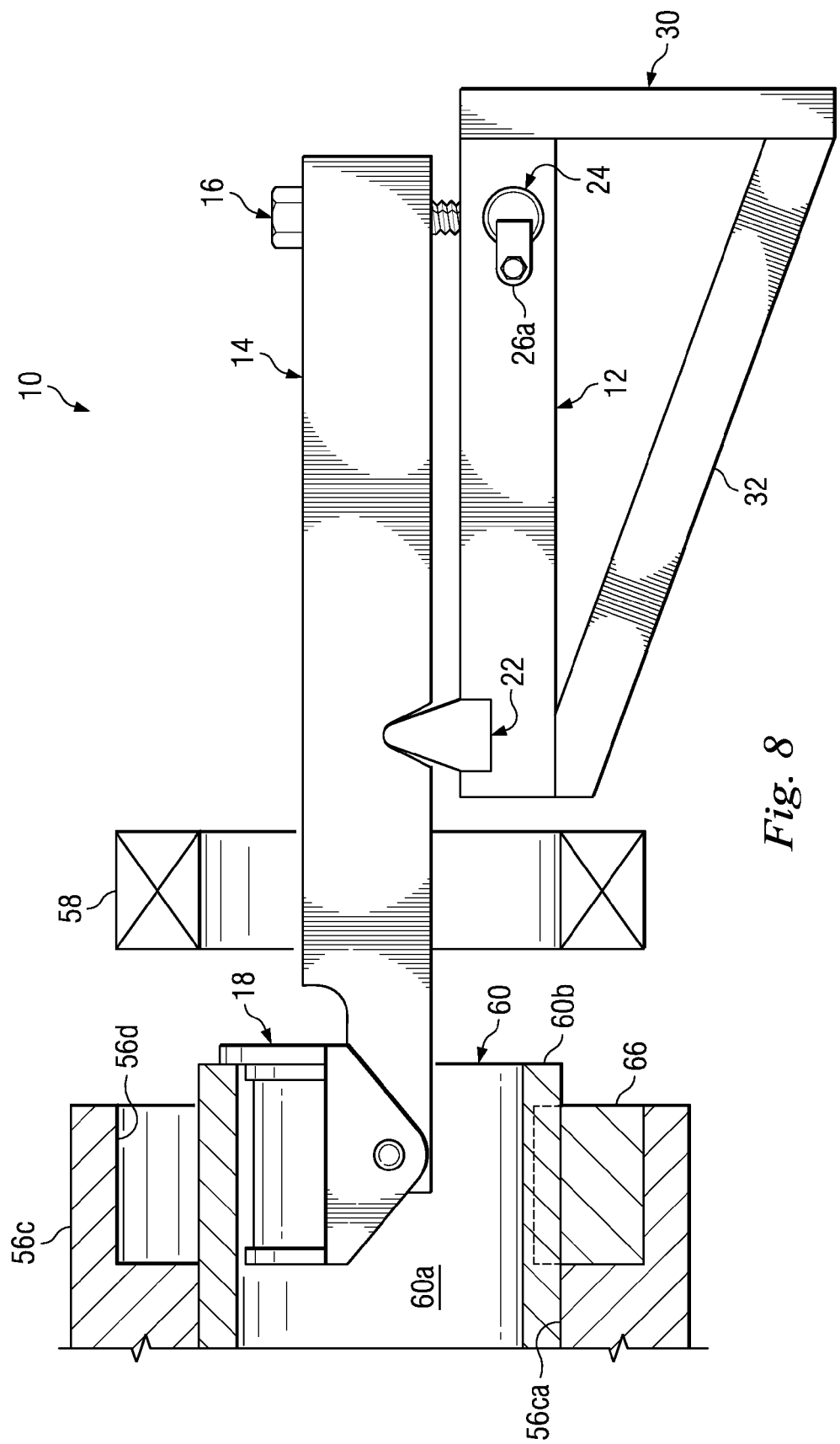
FIG. 8 is a view similar to that of FIG. 7, but depicting the system in yet another operational mode.

In an exemplary embodiment, as illustrated in FIG. 8 with continuing reference to FIGS. 1, 2, 3, 4, 5A, 5B, 6A, 6B and 7, the step 44 of the method 36 includes inserting a block, or radial spacer 66, in the casing 56 immediately below the shaft 60 so that the radial spacer 66 is positioned in the casing 56 where the portion of the bearing assembly 58 upon which the shaft 60 exerted the most force was previously positioned. The fastener 16 is then moved upwards so that the external threaded connection 16c of the fastener 16 begins to disengage from the internal threaded connection 24ba of the cage nut 24. As a result, the arm 14 pivots about the fulcrum block 20 in a counterclockwise direction, as viewed in FIG. 8, thereby lowering the shaft 60 until the shaft 60 contacts and is supported by the radial spacer 66. As a result, the shaft 60 is supported while the position and the horizontal orientation of the shaft 60 are maintained in the casing 56.

Figure 9:
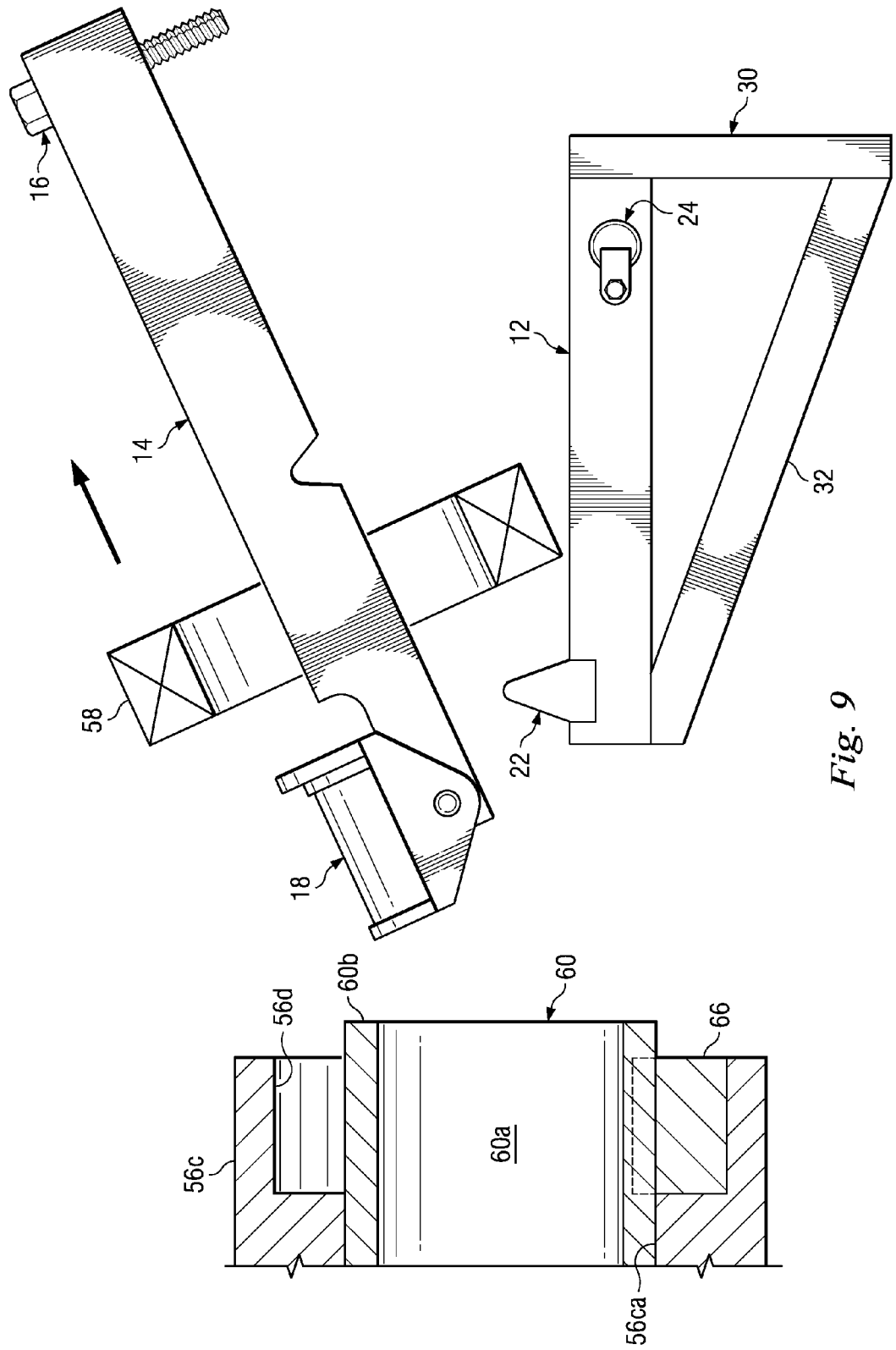
FIG. 9 is a view similar to that of FIG. 8, but depicting the system in yet another operational mode.

In an exemplary embodiment, as illustrated in FIG. 9 with continuing reference to FIGS. 1, 2, 3, 4, 5A, 5B, 6A, 6B, 7 and 8, when the shaft 60 is supported by the radial spacer 66, the fastener 16 is completely disengaged from the cage nut 24, and the lift saddle 18, the arm 14 and the bearing assembly 58 are removed from the casing 56. The remainder of the device 10, including the base member 12, the fulcrum block 22 and the plate 30, remain coupled to and/or disposed in the casing 56.

In an exemplary embodiment, the step 46 of the method 36 includes inspecting the roller bearing assembly 58. In an exemplary embodiment, the step 46 includes inspecting the roller bearing assembly 58 for bearing distress and/or other types of damage to the roller bearing assembly 58 and/or components thereof. In an exemplary embodiment, the step 46 includes inspecting the roller bearing assembly 58 for bearing distress such as, for example, indications that one or more of the roller bearings in the roller bearing assembly 58 have begun to release metal.

In an exemplary embodiment, it is determined in the step 48 whether bearing distress and/or other damage has been detected in the roller bearing assembly 58 during the inspection conducted in the step 46. If not, in the step 50, the bearing assembly 58 is re-installed into the casing 56 while continuing to maintain the position of the shaft 60 in the casing 56.

In an exemplary embodiment, with continuing reference to FIGS. 1, 2, 3, 4, 5A, 5B, 6A, 6B, 7, 8 and 9, to re-install the bearing assembly 58 into the casing 56 in the step 50, the radial clearance 64 is again provided in a manner substantially similar to that described above in connection with the step 40. That is, the arm 14 and the lift saddle 18 are again positioned in the casing 56 as described above, except that the bearing assembly 58 circumferentially extends about the arm 14 when the arm is disposed in the casing 56. The fastener 16 is again driven downward so that the arm 14 pivots about the fulcrum block 22, thereby causing at least a portion of the shaft 60 to move upward and lift off of the radial spacer 66.

In an exemplary embodiment, the radial spacer 66 is removed from the casing 56 and the bearing assembly 58 is slid back over the end 60b of the shaft 60 and re-positioned back to its original position in the casing 56, thus circumferentially extending about the shaft 60.

In an exemplary embodiment, after the bearing assembly 58 has been re-positioned back to its original position in the casing 56, the lift saddle 18 is lowered and thus moves downward in a manner substantially similar to that described above in connection with the step 42. As a result, at least the portion of the shaft 60 in the vicinity of the bearing assembly 58 moves downward and the shaft 60 is again at least partially supported by the bearing assembly 58. The fastener 16 is disengaged from the cage nut 24, and the lift saddle 18, the arm 14 and the fastener 16 are removed from the casing 56. The fulcrum block 22 is also removed from the casing 56. The plate 30 is uncoupled from the flange 56a of the casing 56, and the base member 12, the brace 32 and the plate 30 are removed from the casing 56.

In an exemplary embodiment, if it is determined in the step 48 of the method 36 that bearing distress and/or other damage has been detected in the roller bearing assembly 58, a new or different bearing assembly is installed into the casing 56 in the step 52 in a manner substantially similar to the above-described manner in which the bearing assembly 58 is reinstalled into the casing 56 in the step 50.

In several exemplary embodiments, the method 36 and/or the device 10 permits the confirmation of the integrity of the bearing assembly 58, or the detection of bearing distress or other damage in the bearing assembly 58, without having to appreciably disassemble, or tear down, the engine assembly 54.

Figure 10:
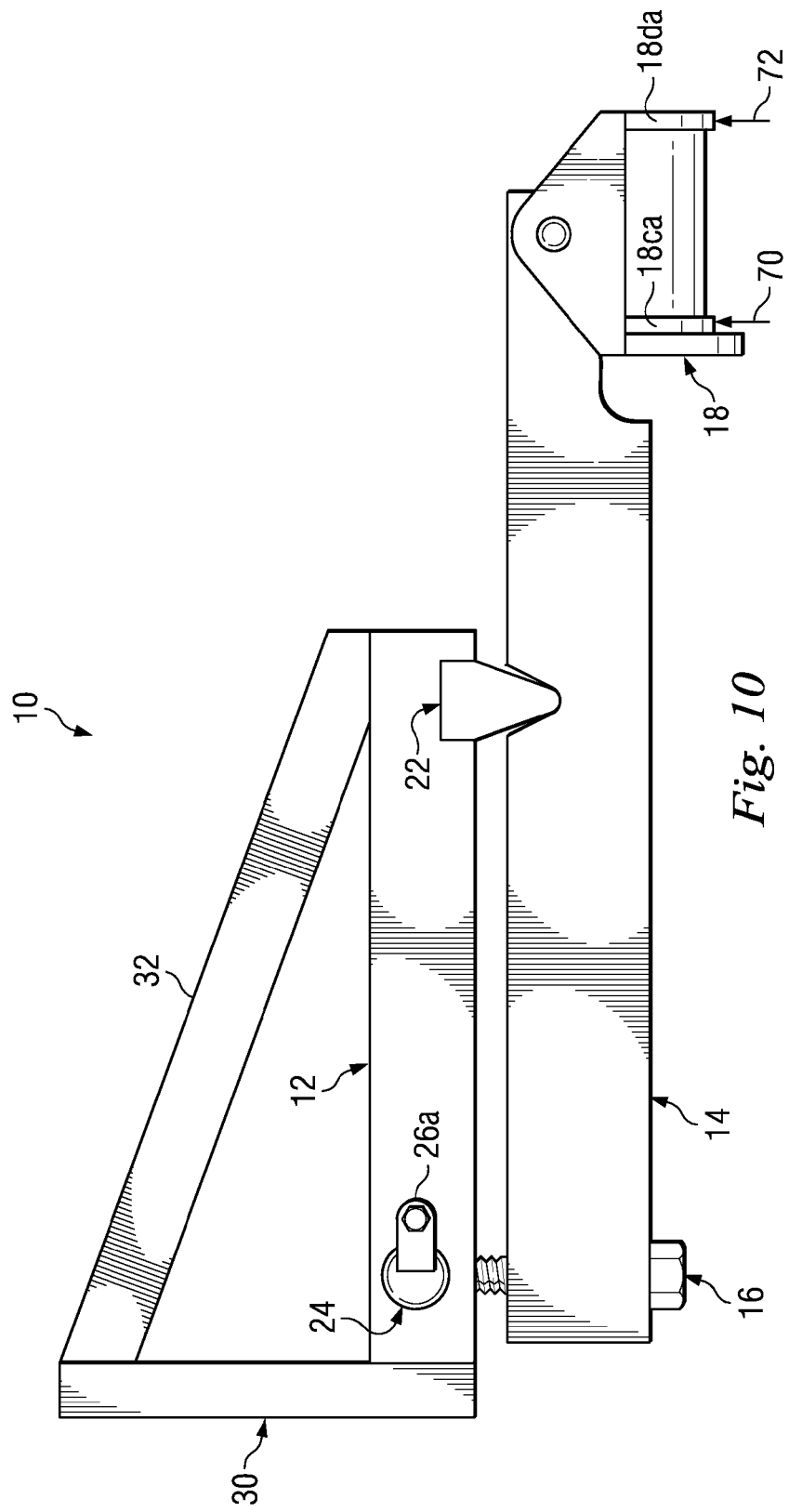
FIG. 10 is a proof load diagram of the lever device of FIGS. 1, 2 and 3.

In an exemplary embodiment, a proof load diagram for the device 10 is illustrated in FIG. 10. The safe weight load (SWL) of the device 10 is about 1,550 lbs, and the proof load of the device 10 is about 3,100 lbs, when the plate 30 is fixed in place using fasteners that extend through the bores 30e, 30f, 30g, 30h, 30i and 30j, respectively, when the fastener 16 is engaged with the cage nut 24, and when a load is evenly dispersed on the arcuate surfaces 18ca and 18da of the lift saddle 18, as indicated by arrows 70 and 72, respectively.

In an exemplary experimental embodiment, the method 36 was experimentally carried out using an exemplary experimental embodiment of the device 10. A Rolls-Royce® Trent 892 gas-turbine jet engine assembly was provided and positioned in a horizontal orientation, that is, in an orientation similar to its normal horizontal operating orientation when mounted under the wing of an airplane such as, for example, a Boeing® 777 aircraft. The roller bearing assembly of the low-pressure turbine module of the Trent 892 gas-turbine jet engine assembly was accessed by removing several, relatively easily-removable components from the back of the Trent 892 engine. By carrying out an experimental embodiment of the method 36 using an experimental embodiment of the device 10, the roller bearing assembly in the low-pressure turbine module of the Trent 892 engine was successfully removed in a manner substantially similar to the above-described manner in which the bearing assembly 58 is removed from the engine assembly 54 in the steps 38, 40, 42 and 44. This was an unexpected result. The roller bearing assembly in the low-pressure turbine module of the Trent 892 engine was successfully removed while the remainder of the gas turbine was still in its assembled configuration, with the remainder of the gas turbine including a shaft adapted to be at least partially supported by the removed roller bearing assembly in a manner similar to the above-described manner in which the shaft 60 is adapted to be at least partially supported by the bearing assembly 58. This was an unexpected result. The use of the device 10 to provide one or more radial clearances in the casing of the low-pressure module of the Trent 892 engine to thereby permit the successful removal of the roller bearing assembly from the casing was an unexpected result. In an exemplary experimental embodiment, at least one radial clearance provided during the experimental operation of the device 10 was estimated to be about 0.007 in. Since the great majority of the Trent 892 engine remained in its assembled configuration, the roller bearing assembly was able to be removed from the low-pressure module of the gas turbine in only a matter of hours, thereby greatly reducing the time and cost associated with removing the roller bearing assembly. This was an unexpected result.

The above-described experimental testing indicates that the above-described method 36 and/or the device 10 may be used to remove one or more roller bearing assemblies from a gas turbine at any location including, for example, on an airfield when the gas turbine is mounted to an aircraft, or in an airplane hangar. This is an unexpected result. The above-described experimental testing indicates that the above-described method 36 and/or the device 10 may be used to remove one or more roller bearing assemblies from a gas turbine at locations other than facilities dedicated to the maintenance of such gas turbines. This is an unexpected result. The above-described experimental testing indicates that the above-described method 36 and/or the device 10 may be used to remove one or more roller bearing assemblies from a gas turbine when the gas turbine is in its normal horizontal orientation. This is an unexpected result.

In several exemplary embodiments, the engine assembly 54 may be a part of a wide variety of engine assemblies such as, for example, a wide variety of gas turbine assemblies, jet engine assemblies, and/or any combination thereof. In several exemplary embodiments, instead of being a part of the engine assembly 54, the casing 56, the bearing assembly 58 and the shaft 60 may be a part of a wide variety of other assemblies and/or systems.

In several exemplary embodiments, instead of, or in addition to gas-turbine jet engines, the method 36 and/or the device 10 may be used to remove one or more bearing assemblies from a wide variety of other types of gas turbines. In several exemplary embodiments, instead of, or in addition to gas turbines, the method 36 and/or the device 10 may be used to remove one or more bearing assemblies from a wide variety of other assemblies and/or systems, including a wide variety of other types of turbines.

In several exemplary embodiments, instead of, or in addition to removing bearing assemblies, the method 36 and/or the device 10 may be used to remove other types of components that extend about shafts.

In several exemplary embodiments, instead of, or in addition to lifting shafts and/or removing bearing assemblies, the method 36 and/or the device 10 may be used in a wide variety of other applications.

In several exemplary embodiments, instead of, or in addition to engaging the fastener 16 with, or disengaging the fastener 16 from, the cage nut 24, the pivoting of the arm 14 about the fulcrum block 22 may be effected using a wide variety of other systems, components and/or techniques. In several exemplary embodiments, the pivoting of the arm 14 about the fulcrum block 22 may be effected by placing a weight on, or removing the weight from, the end portion of the arm 14 opposing the lift saddle 18, by activating a mechanical or electromechanical actuator, and/or by any combination thereof.

A method has been described that includes providing a casing, a bearing assembly positioned in the casing, and a shaft extending axially through the bearing assembly, the shaft being at least partially supported by the bearing assembly; and removing the bearing assembly from the casing while generally maintaining the position of the shaft in the casing. In an exemplary embodiment, removing the bearing assembly from the casing while generally maintaining the position of the shaft in the casing comprises providing a radial clearance between at least a portion of the shaft and at least a portion of the bearing assembly; and moving the bearing assembly off of the shaft during or after providing the radial clearance. In an exemplary embodiment, removing the bearing assembly from the casing while generally maintaining the position of the shaft in the casing comprises applying a force against the shaft, wherein the force is generally transverse to the axial extension of the shaft through the bearing assembly; and moving the bearing assembly off of the shaft during applying the force against the shaft. In an exemplary embodiment, the shaft comprises an axially-extending passage defining an inside surface of the shaft; wherein applying the force against the shaft comprises applying the force against the inside surface of the shaft defined by the axially-extending passage. In an exemplary embodiment, the shaft is oriented horizontally in the casing; and wherein removing the bearing assembly from the casing while generally maintaining the position of the shaft in the casing comprises removing the bearing assembly from the casing while generally maintaining the position of the shaft in the casing and the horizontal orientation of the shaft in the casing. In an exemplary embodiment, providing a casing, a bearing assembly positioned in the casing, and a shaft extending axially through the bearing assembly comprises providing a gas turbine comprising the casing, the bearing assembly and the shaft. In an exemplary embodiment, the method comprises inspecting the bearing assembly for damage after removing the bearing assembly from the casing while continuing to generally maintain the position of the shaft in the casing. In an exemplary embodiment, inspecting the bearing assembly for damage while continuing to generally maintain the position of the shaft in the casing comprises inspecting the bearing assembly for bearing distress while continuing to generally maintain the position of the shaft in the casing. In an exemplary embodiment, the method comprises if damage is detected during inspecting the bearing assembly for damage, then installing another bearing assembly in the casing while continuing to generally maintain the position of the shaft in the casing; and at least partially supporting the shaft using the another bearing assembly. In an exemplary embodiment, the method comprises if damage is not detected during inspecting the bearing assembly for damage, then reinstalling the bearing assembly in the casing while continuing to generally maintain the position of the shaft in the casing. In an exemplary embodiment, the method comprises at least partially supporting the shaft after removing the bearing assembly from the casing. In an exemplary embodiment, the bearing assembly is positioned at an axial location along the shaft before the bearing assembly is removed from the casing; and wherein at least partially supporting the shaft after removing the bearing assembly from the casing comprises positioning a radial spacer in the casing at the axial location along the shaft after removing the bearing assembly from the casing.

A system has been described that includes a fulcrum block; an arm adapted to pivot about the fulcrum block; and a lift block pivotally coupled to the arm and adapted to at least partially extend within an axially-extending passage of a shaft, the lift block comprising at least one arcuate surface adapted to apply a force against an inside surface of the shaft defined by the axially-extending passage in response to the pivoting of the arm about the fulcrum block. In an exemplary embodiment, the system comprises a base member adapted to support the fulcrum block; and a fastener adapted to extend through the arm and be movably coupled to the base member; wherein the arm pivots about the fulcrum block when the fastener extends through the arm, is movably coupled to the base member, and moves relative to the base member. In an exemplary embodiment, the system comprises the shaft; and a first configuration in which the fulcrum block is supported by the base member; the lift block at least partially extends within the passage of the shaft; and the fastener extends through the arm and is movably coupled to the base member. In an exemplary embodiment, the system comprises a second configuration in which the fulcrum block is supported by the base member; the lift block at least partially extends within the passage of the shaft; the fastener extends through the arm and is movably coupled to the base member; and the at least one arcuate surface applies the force against the inside surface of the shaft. In an exemplary embodiment, the system comprises a casing in which the shaft is at least partially positioned; and a plate coupled to the casing and the base member, wherein the base member extends away from the plate and towards the shaft. In an exemplary embodiment, the lift block comprises a flange defining a vertically-extending surface; and wherein, when the system is in the second configuration, the vertically-extending surface defined by the flange contacts an end of the shaft to generally resist relative movement between the lift block and the shaft. In an exemplary embodiment, the system comprises a casing in which the shaft is at least partially positioned; and a bearing assembly through which the shaft extends, the bearing assembly being positioned in the casing and adapted to at least partially support the shaft; wherein, when the system is in the first configuration, the bearing assembly at least partially supports the shaft and relative movement between the bearing assembly and the shaft is generally prevented; and wherein, when the system is in the second configuration, relative movement between the bearing assembly and the shaft is generally permitted. In an exemplary embodiment, the system comprises a spacer adapted to be positioned in the casing to at least partially support the shaft; and a third configuration in which the spacer is positioned in the casing and at least partially supports the shaft. In an exemplary embodiment, the system comprises a gas turbine comprising the shaft; a casing in which the shaft is at least partially positioned; and a bearing assembly through which the shaft extends in a horizontal direction, the bearing assembly being positioned in the casing and adapted to at least partially support the shaft; a first configuration in which the bearing assembly at least partially supports the shaft and relative movement between the bearing assembly and the shaft in the horizontal direction is generally prevented; and a second configuration in which the at least one arcuate surface applies the force against the inside surface of the shaft, and relative movement between the bearing assembly and the shaft in the horizontal direction is generally permitted.

A system has been described that includes means for providing a casing, a bearing assembly positioned in the casing, and a shaft extending axially through the bearing assembly, the shaft being at least partially supported by the bearing assembly; and means for removing the bearing assembly from the casing while generally maintaining the position of the shaft in the casing. In an exemplary embodiment, means for removing the bearing assembly from the casing while generally maintaining the position of the shaft in the casing comprises means for providing a radial clearance between at least a portion of the shaft and at least a portion of the bearing assembly; and means for moving the bearing assembly off of the shaft during or after providing the radial clearance. In an exemplary embodiment, means for removing the bearing assembly from the casing while generally maintaining the position of the shaft in the casing comprises means for applying a force against the shaft, wherein the force is generally transverse to the axial extension of the shaft through the bearing assembly; and means for moving the bearing assembly off of the shaft during applying the force against the shaft. In an exemplary embodiment, the shaft comprises an axially-extending passage defining an inside surface of the shaft; wherein means for applying the force against the shaft comprises means for applying the force against the inside surface of the shaft defined by the axially-extending passage. In an exemplary embodiment, the shaft is oriented horizontally in the casing; and wherein means for removing the bearing assembly from the casing while generally maintaining the position of the shaft in the casing comprises means for removing the bearing assembly from the casing while generally maintaining the position of the shaft in the casing and the horizontal orientation of the shaft in the casing. In an exemplary embodiment, means for providing a casing, a bearing assembly positioned in the casing, and a shaft extending axially through the bearing assembly comprises means for providing a gas turbine comprising the casing, the bearing assembly and the shaft. In an exemplary embodiment, the system comprises means for inspecting the bearing assembly for damage after removing the bearing assembly from the casing while continuing to generally maintain the position of the shaft in the casing. In an exemplary embodiment, means for inspecting the bearing assembly for damage while continuing to generally maintain the position of the shaft in the casing comprises means for inspecting the bearing assembly for bearing distress while continuing to generally maintain the position of the shaft in the casing. In an exemplary embodiment, the system comprises means for if damage is detected during inspecting the bearing assembly for damage, then installing another bearing assembly in the casing while continuing to generally maintain the position of the shaft in the casing; and means for at least partially supporting the shaft using the another bearing assembly. In an exemplary embodiment, the system comprises means for if damage is not detected during inspecting the bearing assembly for damage, then reinstalling the bearing assembly in the casing while continuing to generally maintain the position of the shaft in the casing. In an exemplary embodiment, the system comprises means for at least partially supporting the shaft after removing the bearing assembly from the casing. In an exemplary embodiment, the bearing assembly is positioned at an axial location along the shaft before the bearing assembly is removed from the casing; and wherein means for at least partially supporting the shaft after removing the bearing assembly from the casing comprises means for positioning a radial spacer in the casing at the axial location along the shaft after removing the bearing assembly from the casing.

A method has been described that includes providing a gas turbine comprising a casing, a bearing assembly positioned in the casing, and a shaft extending axially through the bearing assembly, the shaft being horizontally oriented in the casing and at least partially supported by the bearing assembly, the shaft comprising an axially-extending passage defining an inside surface of the shaft; removing the bearing assembly from the casing while generally maintaining the position of the shaft in the casing and the horizontal orientation of the shaft in the casing, comprising applying a force against the inside surface of the shaft defined by the axially-extending passage, wherein the force is generally transverse to the axial extension of the shaft through the bearing assembly; and moving the bearing assembly off of the shaft during applying the force against the shaft; at least partially supporting the shaft after removing the bearing assembly from the casing; inspecting the bearing assembly for damage after removing the bearing assembly from the casing while continuing to generally maintain the position of the shaft in the casing; if damage is detected during inspecting the bearing assembly for damage, then installing another bearing assembly in the casing while continuing to generally maintain the position of the shaft in the casing; and if damage is not detected during inspecting the bearing assembly for damage, then reinstalling the bearing assembly in the casing while continuing to generally maintain the position of the shaft in the casing; wherein the bearing assembly is positioned at an axial location along the shaft before the bearing assembly is removed from the casing; and wherein at least partially supporting the shaft after removing the bearing assembly from the casing comprises positioning a radial spacer in the casing at the axial location along the shaft after removing the bearing assembly from the casing.

A system has been described that includes a gas turbine comprising a casing; a shaft at least partially positioned in the casing and comprising an axially-extending passage defining an inside surface of the shaft; and a bearing assembly through which the shaft extends in a horizontal direction, the bearing assembly being positioned in the casing and adapted to at least partially support the shaft; a device adapted to be coupled to the gas turbine, the device comprising a fulcrum block; an arm adapted to pivot about the fulcrum block; a lift block pivotally coupled to the arm and adapted to at least partially extend within the passage defined by the shaft, the lift block comprising at least one arcuate surface adapted to apply a force against the inside surface of the shaft in response to the pivoting of the arm about the fulcrum block; a base member adapted to support the fulcrum block; a fastener adapted to extend through the arm and be movably coupled to the base member, wherein the arm pivots about the fulcrum block when the fastener extends through the arm, is movably coupled to the base member, and moves relative to the base member; and a plate coupled the base member and adapted to be coupled to the casing to couple the device to the gas turbine, wherein the base member extends away from the plate and towards the shaft when the plate is coupled to the casing; a first configuration in which the plate is coupled to the casing to couple the device to the gas turbine; the fulcrum block is supported by the base member; the lift block at least partially extends within the passage of the shaft; the fastener extends through the arm and is movably coupled to the base member; the bearing assembly at least partially supports the shaft; and relative movement between the bearing assembly and the shaft in the horizontal direction is generally prevented; and a second configuration in which the plate is coupled to the casing to couple the device to the gas turbine; the fulcrum block is supported by the base member; the lift block at least partially extends within the passage of the shaft; the fastener extends through the arm and is movably coupled to the base member; the at least one arcuate surface applies the force against the inside surface of the shaft; and relative movement between the bearing assembly and the shaft in the horizontal direction is generally permitted.

A system has been described that includes means for providing a gas turbine comprising a casing, a bearing assembly positioned in the casing, and a shaft extending axially through the bearing assembly, the shaft being horizontally oriented in the casing and at least partially supported by the bearing assembly, the shaft comprising an axially-extending passage defining an inside surface of the shaft; means for removing the bearing assembly from the casing while generally maintaining the position of the shaft in the casing and the horizontal orientation of the shaft in the casing, comprising means for applying a force against the inside surface of the shaft defined by the axially-extending passage, wherein the force is generally transverse to the axial extension of the shaft through the bearing assembly; and means for moving the bearing assembly off of the shaft during applying the force against the shaft; means for at least partially supporting the shaft after removing the bearing assembly from the casing; means for inspecting the bearing assembly for damage after removing the bearing assembly from the casing while continuing to generally maintain the position of the shaft in the casing; means for if damage is detected during inspecting the bearing assembly for damage, then installing another bearing assembly in the casing while continuing to generally maintain the position of the shaft in the casing; and means for if damage is not detected during inspecting the bearing assembly for damage, then reinstalling the bearing assembly in the casing while continuing to generally maintain the position of the shaft in the casing; wherein the bearing assembly is positioned at an axial location along the shaft before the bearing assembly is removed from the casing; and wherein means for at least partially supporting the shaft after removing the bearing assembly from the casing comprises means for positioning a radial spacer in the casing at the axial location along the shaft after removing the bearing assembly from the casing.

It is understood that variations may be made in the foregoing without departing from the scope of the disclosure.

Any spatial references such as, for example, "upper," "lower," "above," "below," "between," "vertical," "horizontal," "angular," "upward," "downward," "side-to-side," "left-to-right," "right-to-left," "top-to-bottom," "bottom-to-top," "top," "bottom," etc., are for the purpose of illustration only and do not limit the specific orientation or location of the structure described above.

In several exemplary embodiments, one or more of the operational steps in each embodiment may be omitted. Moreover, in some instances, some features of the present disclosure may be employed without a corresponding use of the other features. Moreover, one or more of the above-described embodiments and/or variations may be combined in whole or in part with any one or more of the other above-described embodiments and/or variations.

Although several exemplary embodiments have been described in detail above, the embodiments described are exemplary only and are not limiting, and those skilled in the art will readily appreciate that many other modifications, changes and/or substitutions are possible in the exemplary embodiments without materially departing from the novel teachings and advantages of the present disclosure. Accordingly, all such modifications, changes and/or substitutions are intended to be included within the scope of this disclosure as defined in the following claims. In the claims, means-plus-function clauses are intended to cover the structures described herein as performing the recited function and not only structural equivalents, but also equivalent structures.

What is claimed is:

1. A system comprising:
   a shaft comprising an axially-extending passage, the axially-extending passage defining an inside surface of the shaft;
   a bearing assembly through which the shaft extends;
   a fulcrum block;
   an arm adapted to pivot about the fulcrum block;
   a lift block pivotally coupled to the arm, the lift block comprising at least one surface adapted to apply a force against the inside surface of the shaft defined by the axially-extending passage in response to the pivoting of the arm about the fulcrum block;
   a first configuration in which the bearing assembly at least partially supports the shaft and relative movement between the bearing assembly and the shaft is generally prevented; and
   a second configuration in which the lift block at least partially extends within the axially-extending passage of the shaft, the at least one surface of the lift block applies the force against the inside surface of the shaft, and relative movement between the bearing assembly and the shaft is generally permitted.

2. The system of claim 1 further comprising:
   a base member adapted to support the fulcrum block; and
   a fastener adapted to extend through the arm and be movably coupled to the base member;
   wherein the arm pivots about the fulcrum block when the fastener extends through the arm, is movably coupled to the base member, and moves relative to the base member.

3. The system of claim 2
   wherein, when the system is in the first configuration:
   the fulcrum block is supported by the base member;
   the lift block at least partially extends within the passage of the shaft; and
   the fastener extends through the arm and is movably coupled to the base member.

4. The system of claim 3
   wherein, when the system is in the second configuration:
   the fulcrum block is supported by the base member; and
   the fastener extends through the arm and is movably coupled to the base member.

5. The system of claim 4 further comprising:
   a casing in which the shaft is at least partially positioned; and
   a plate coupled to the casing and the base member, wherein the base member extends away from the plate and towards the shaft.

6. The system of claim 4 wherein the lift block comprises a flange defining a vertically-extending surface; and
   wherein, when the system is in the second configuration, the vertically-extending surface defined by the flange contacts an end of the shaft to generally resist relative movement between the lift block and the shaft.

7. The system of claim 4 further comprising:
   a spacer adapted to be positioned in the casing to at least partially support the shaft; and
   a third configuration in which the spacer is positioned in the casing and at least partially supports the shaft.

8. A system comprising:
   a casing;
   a bearing assembly positioned in the casing;

a shaft extending axially through the bearing assembly, the shaft being at least partially supported by the bearing assembly; and means for removing the bearing assembly from the casing while generally maintaining the position of the shaft in the casing.

9. The system of claim 8 wherein means for removing the bearing assembly from the casing while generally maintaining the position of the shaft in the casing comprises:

means for providing a radial clearance between at least a portion of the shaft and at least a portion of the bearing assembly while generally maintaining the position of the shaft in the casing.

10. The system of claim 8 wherein means for removing the bearing assembly from the casing while generally maintaining the position of the shaft in the casing comprises:

means for applying a force against the shaft while generally maintaining the position of the shaft in the casing, wherein the force is generally transverse to the axial extension of the shaft through the bearing assembly.

11. The system of claim 10 wherein the shaft comprises an axially-extending passage defining an inside surface of the shaft;

wherein means for applying the force against the shaft while generally maintaining the position of the shaft in the casing comprises:

means for applying the force against the inside surface of the shaft defined by the axially-extending passage while generally maintaining the position of the shaft in the casing.

12. The system of claim 8 further comprising:

means for at least partially supporting the shaft after removing the bearing assembly from the casing.

13. A system comprising:

a gas turbine comprising:
   a casing;
   a shaft at least partially positioned in the casing and comprising an axially-extending passage defining an inside surface of the shaft; and
   a bearing assembly through which the shaft extends in a horizontal direction, the bearing assembly being positioned in the casing and adapted to at least partially support the shaft;

a device adapted to be coupled to the gas turbine, the device comprising:
   a fulcrum block;
   an arm adapted to pivot about the fulcrum block;
   a lift block pivotally coupled to the arm and adapted to at least partially extend within the passage defined by the shaft, the lift block comprising at least one arcuate surface adapted to apply a force against the inside surface of the shaft in response to the pivoting of the arm about the fulcrum block;
   a base member adapted to support the fulcrum block;
   a fastener adapted to extend through the arm and be movably coupled to the base member, wherein the arm pivots about the fulcrum block when the fastener extends through the arm, is movably coupled to the base member, and moves relative to the base member; and
   a plate coupled the base member and adapted to be coupled to the casing to couple the device to the gas turbine, wherein the base member extends away from the plate and towards the shaft when the plate is coupled to the casing;

a first configuration in which:
   the plate is coupled to the casing to couple the device to the gas turbine;
   the fulcrum block is supported by the base member;
   the lift block at least partially extends within the passage of the shaft;
   the fastener extends through the arm and is movably coupled to the base member;
   the bearing assembly at least partially supports the shaft; and
   relative movement between the bearing assembly and the shaft in the horizontal direction is generally prevented;
and
a second configuration in which:
   the plate is coupled to the casing to couple the device to the gas turbine;
   the fulcrum block is supported by the base member;
   the lift block at least partially extends within the passage of the shaft;
   the fastener extends through the arm and is movably coupled to the base member;
   the at least one arcuate surface applies the force against the inside surface of the shaft; and
   relative movement between the bearing assembly and the shaft in the horizontal direction is generally permitted.

14. A system comprising:

a casing;
a bearing assembly positioned in the casing;
a shaft extending axially through the bearing assembly, the shaft being horizontally oriented in the casing and at least partially supported by the bearing assembly, the shaft comprising an axially-extending passage defining an inside surface of the shaft;
a lift block adapted to at least partially extend within the passage defined by the shaft, the lift block comprising at least one surface adapted to apply a force against the inside surface of the shaft;
an arm to which the lift block is pivotally coupled; and
a fulcrum block about which the arm is adapted to pivot;
wherein, when the lift block at least partially extends within the passage defined by the shaft, the at least one surface of the lift block applies the force against the inside surface of the shaft in response to the pivoting of the arm about the fulcrum block.

15. The system of claim 8, wherein means for removing the bearing assembly from the casing while generally maintaining the position of the shaft in the casing comprises:

a fulcrum block;
an arm adapted to pivot about the fulcrum block; and
a lift block pivotally coupled to the arm and adapted to at least partially extend within the passage defined by the shaft, the lift block comprising at least one surface adapted to apply a force against the inside surface of the shaft in response to the pivoting of the arm about the fulcrum block.

16. The system of claim 15, wherein, in response to the application of the force against the inside surface of the shaft, a radial clearance between at least a portion of the shaft and at least a portion of the bearing assembly is provided and relative movement between the bearing assembly and the shaft is generally permitted.

17. The system of claim 15, wherein means for removing the bearing assembly from the casing while generally maintaining the position of the shaft in the casing further comprises:

a base member adapted to support the fulcrum block;

a fastener adapted to extend through the arm and be movably coupled to the base member, wherein the arm pivots about the fulcrum block when the fastener extends through the arm, is movably coupled to the base member, and moves relative to the base member; and a plate coupled the base member and adapted to be coupled to the casing, wherein the base member extends away from the plate and towards the shaft when the plate is coupled to the casing.

18. The system of claim 8, wherein means for removing the bearing assembly from the casing while generally maintaining the position of the shaft in the casing comprises:

a fulcrum block;

an arm adapted to pivot about the fulcrum block;

a lift block pivotally coupled to the arm and adapted to at least partially extend within the passage defined by the shaft, the lift block comprising at least one surface adapted to apply a force against the inside surface of the shaft in response to the pivoting of the arm about the fulcrum block;

a base member adapted to support the fulcrum block;

a fastener adapted to extend through the arm and be movably coupled to the base member, wherein the arm pivots about the fulcrum block when the fastener extends through the arm, is movably coupled to the base member, and moves relative to the base member; and a plate coupled the base member and adapted to be coupled to the casing, wherein the base member extends away from the plate and towards the shaft when the plate is coupled to the casing;

wherein, in response to the application of the force against the inside surface of the shaft, a radial clearance between at least a portion of the shaft and at least a portion of the bearing assembly is provided and relative movement between the bearing assembly and the shaft is generally permitted.

19. The system of claim 14, further comprising:

a base member adapted to support the fulcrum block; and a fastener adapted to extend through the arm and be movably coupled to the base member, wherein the arm pivots about the fulcrum block when the fastener extends through the arm, is movably coupled to the base member, and moves relative to the base member.

20. The system of claim 19, further comprising:

a plate coupled the base member and adapted to be coupled to the casing, wherein the base member extends away from the plate and towards the shaft when the plate is coupled to the casing.

\* \* \* \* \*